United States Patent [19]

Little et al.

[11] 4,153,529

[45] May 8, 1979

[54] MEANS AND METHOD FOR INDUCING UNIFORM PARALLEL ALIGNMENT OF LIQUID CRYSTAL MATERIAL IN A LIQUID CRYSTAL CELL

[75] Inventors: Michael J. Little, Tarzana; Hugh L. Garvin, Malibu; Yat-Shir Lee, Costa Mesa, all of Calif.

[73] Assignee: Hughes Aircraft Company, Culver City, Calif.

[21] Appl. No.: 570,303

[22] Filed: Apr. 21, 1975

[51] Int. Cl.$^2$ .................... C23C 15/00; G02F 1/13
[52] U.S. Cl. .................... 204/192 EC; 156/643; 204/192 E; 350/341
[58] Field of Search .................... 204/192, 164; 350/160 LC; 427/38, 162; 156/3, 643; 29/592; 219/121 EB, 121 EM, 121 P

[56] References Cited

U.S. PATENT DOCUMENTS

| | | | |
|---|---|---|---|
| 3,834,792 | 9/1974 | Janning | 350/160 LC |
| 3,914,020 | 10/1975 | Helfrich | 350/160 LC |

OTHER PUBLICATIONS

J. L. Janning, "Thin Film Surface Orientation for Liquid Crystals", *Applied Physics Letters*, vol. 21, No. 4, Aug. 1972, pp. 173-174.
H. L. Garvin, "High Resolution Fabrication by Ion Beam Sputtering", *Solid State Technology*, vol. 16, No. 11, Nov. 1973, pp. 31-36.

*Primary Examiner*—Aaron Weisstuch
*Attorney, Agent, or Firm*—Lewis B. Sternfels; W. H. MacAllister

[57] ABSTRACT

Electrode surfaces are coated with a passivating material (silicon dioxide, aluminum oxide or titanium dioxide) or with a reflecting material (chromium or chromium and gold) or with a special alignment material (carbon) using standard vacuum sputtering, vacuum evaporation, electrodeposition, or chemical vapor deposition techniques. After sufficient thickness of material has been deposited, the substrate is exposed to a broad or narrow beam of neutralized argon ions of a few kilo-electron-volts energy. The beam of argon ions is incident at a grazing angle to the surface, typically 20°. Exposure of the overcoating results in a microscopic condition believed to comprise a "corrugated" surface with "ridges" and "valleys" parallel to the direction of the incident beam. These microscopically fine grooves or streaks are (1) reproducibly effective in causing parallel alignment of the liquid crystal molecules, (2) are durable to repeated cleaning procedures and air-bake treatments, and (3) are amenable to production applications in conjunction with vacuum deposition equipment.

17 Claims, 2 Drawing Figures

MEANS AND METHOD FOR INDUCING UNIFORM PARALLEL ALIGNMENT OF LIQUID CRYSTAL MATERIAL IN A LIQUID CRYSTAL CELL

BACKGROUND OF THE INVENTION

1. Field of the Invention

The present invention relates to means and method for inducing uniform molecular alignment in a liquid crystal cell.

2. Description of the Prior Art

It is desirable to induce uniform molecular alignment in sandwich-type liquid crystal cells for several reasons. For example, it is known that the temporal response of liquid crystals is dependent, inter alia, on the alignment of the liquid crystal material. Also, uniformity of alignment influences the contrast ratio of the device by affecting the "field-off" appearance of the liquid crystal. The prevailing technique of achieving parallel alignment is by rubbing, such as with butcher paper, diamond dust, lens paper, cotton swabs, foam swabs, all with varying degrees of success. The most universal problem with rubbing is the lack of consistency and control of the surface texture in being able to obtain reproducible results. In addition, all these rubbing techniques lack, to one degree or another, the advantages of permanence, uniformity, reproducibility, cleanliness, and ease of application.

It has also been suggested by J. L. Janning, in "Thin Film Surface Orientation For Liquid Crystals" Applied Physics Letters 21, 173 (1972) to cause parallel alignment of liquid crystal molecules by treating the surface by rubbing or by deposition of thin films to approximately 200 to 500 Angstroms thickness of silicon monoxide and silicon dioxide, by evaporation at a very low grazing angle to the surface. These techniques also have suffered limitations as to reproducibility and durability.

SUMMARY OF THE INVENTION

The present invention overcomes and avoids the above-mentioned problems and, in addition, readily lends itself to mass-production schemes and to reducing the electrochemical reactivity of the electrode with a liquid crystal material. Briefly, the invention utilizes a broad or narrow beam of neutralized ions of a few kiloelectron-volt energy at a shallow grazing angle incident to the surface of the electrode to provide microscopically fine grooves or streaks on the surface which induces parallel alignment of liquid crystal material.

It is, therefore, an object of the present invention to provide for means and method for inducing uniform molecular alignment in liquid crystal cells.

Another object is to provide for obtaining microscopically fine grooves or streaks on the surface of a liquid crystal display electrode.

Another object is to provide such microscopically fine grooves or streaks which are reproducibly effective in causing parallel alignment of liquid crystal molecules.

Another object is to provide for such microscopically fine grooves or streaks which are durable to repeated cleaning procedures and air-bake treatment.

Another object is to provide for such microscopically fine grooves or streaks which are amenable to production applications in conjunction with vacuum deposition equipment.

Another object is to provide for a method for shallow-angle ion beam sputtering for use in liquid crystal devices.

Another object is to provide for such a technique for reducing electrochemical reactivity of a liquid crystal electrode with the liquid crystal material.

Other aims and objects as well as a more complete understanding of the present invention will appear from the following explanation of exemplary embodiments and the accompanying drawings thereof.

DESCRIPTION OF THE PREFERRED EMBODIMENTS

Figure 1:
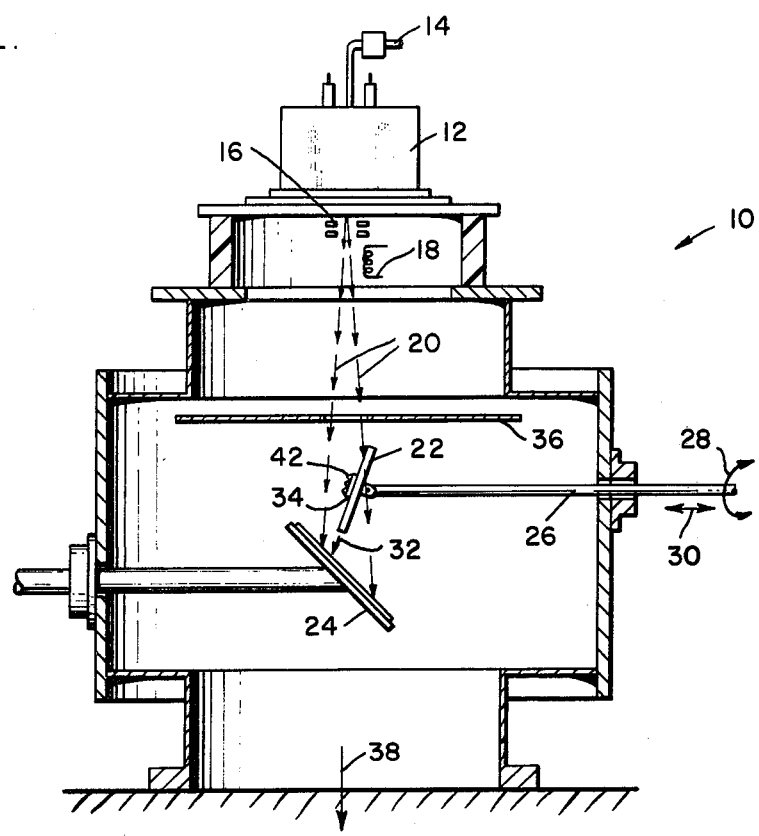
FIG. 1 is a schematic diagram of an ion beam sputtering system, exemplified as utilizing a duoplasmatron ion source, for shallow angle ion beam etching of a substrate.
Figure 2:
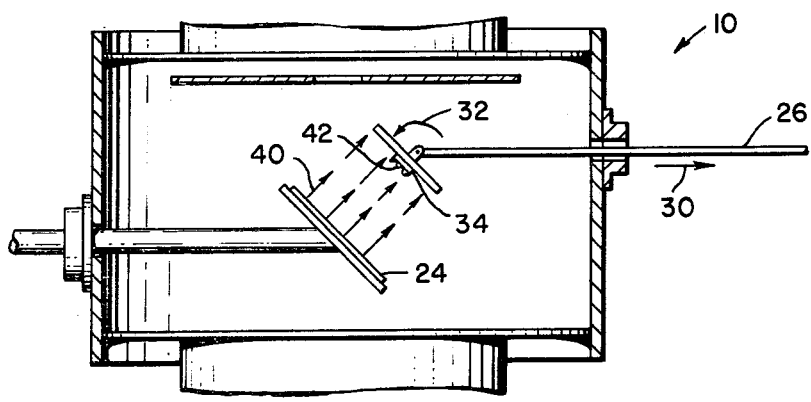
FIG. 2 is a view of the system depicted in FIG. 1 for sputtering target material onto the substrate prior to micromachining thereof.

Accordingly, referring to FIGS. 1 and 2, an illustrative system 10 for obtaining the objects of the present invention includes a duoplasmatron ion source 12 having a gas inlet 14 of any suitable gas, preferably an inert gas, such as of argon, an electrode outlet 16 for directing ions formed from the gas toward a target, and a neutralizer 18, such as for maintaining the target electronically neutral, thereby for preventing the buildup of positive charges on the target. Because of the existence of electrons from neutralizer 18, the average charge density or space charge of the ion beam is also kept neutral.

Positionable in the path of the ions, illustratively depicted as arrows 20, is a holder 22 and a sputtering target 24. Holder 22 is secured in any suitable manner to a manipulating rod 26 which can rotate, axially move, or pivot holder 22, as represented respectively by arrows 28, 30, and 32. Positioned on holder 22 and secured thereto by any suitable means is a substrate 34. Positioned below holder 22 is target 24 upon which any source of material to be sputter deposited on substrate 34 may be placed.

The system is completed by a beam limiting aperture 36 and an exhaust system leading to a vacuum pump, as represented by arrow 38.

Briefly, in the operation of the present invention as described with respect to a first embodiment thereof, a substrate 34 of suitable material is secured to holder 22 and positioned, as shown in FIG. 2, facing sputtering target 24 so that, upon application of ions 20 onto the sputtering target, material from the target is sputter deposited onto substrate 34 as represented by arrows 40, to provide a thin sputtered layer 42 on the substrate. After sufficient thickness of material 42 has been deposited on substrate 34, the source of ions is stopped and holder 22 is repositioned as shown in FIG. 1 so as to be directly in the path of ion beam 20 when the source 12 is reenergized. Upon energization of source 12, ion beam 20 then strikes surface 42 and substrate 34 at an angle and with small energy sufficient for scrubbing or otherwise providing microscopically fine grooves or streaks in the surface of layer 42. It is believed that the result of this action provides a microscopically corrugated surface with ridges and valleys parallel to the direction of the incident beam.

It is to be understood that other techniques of depositing layer 42 onto substrate 34 may be employed, such as by radio-frequency sputtering, vacuum evaporation, electro-deposition and chemical vapor deposition. In general, substrate 34 configured as a liquid crystal display electrode surface which is coated with some passivating or reflecting material, or any other material which is needed to enable the liquid crystal device to operate in its intended manner. As is well known, such a layer inhibits electro-chemical action with the liquid crystal material, subjects the electrode material to the least deterioration in time and avoids undesired changes in the liquid crystal characteristics.

Coating of substrate 34 may be by a passivating material such as of silicon dioxide, aluminum oxide, or titanium dioxide, obtained by conventional sputtering techniques. For a reflecting surface coating or layer, chromium or a combination of chromium and gold may be utilized, and applied by conventional thermal evaporation or sputtering techniques. For alignment of a direct current cell, the material coating may be carbon which also may be applied by conventional thermal evaporation or sputtering techniques. Regardless of the specific materials used for coating 42, the thicknesses thereof are chosen for the desired optical and conductive characteristics. Generally, such a thickness is in the range of 100 Angstroms to 5000 Angstroms.

In the scrubbing or ion beam micromachining operation, directed and neutralized ion beams are utilized. It is preferred that such an ion beam be a broad beam to minimize fringing effects on layer 42, that is, to obtain as parallel an ion beam as is possible. However, if it is desired, a narrow beam may be utilized and the surface 42 may be moved with respect to the narrow beam, or vice versa.

The beam is preferably directed at a shallow angle, with the preferred angles being between 10° and 30°. Below 10°, sputtering tends to degrade the surface while above 40°, the alignment becomes less uniform. It is to be understood, however, that if degradation of sputtering or nonuniformity of alignment can be avoided while directing the ion beam at other than the preferred range of 10° to 30°, such other angles of grazing may be utilized.

The specific material of the ion beam may be any gas which will provide a sufficient scrubbing action. Such a gas is argon at an energy of 1–3 kilo-electron-volts. Since the result desired is effective scrubbing, the selection of the ion species, its energy, and its intensity (current density or flux) are adjusted to obtain the desired end results of scrubbing.

After the surface has been suitably scrubbed, the liquid crystal material is placed on the surface and the whole is assembled into the complete cell.

The present invention has been utilized to fabricate several types of devices, as exemplified by an alternating current light valve, a reflecting device, a direct current light valve. Fabrication of electrode surfaces are described with the following specific examples.

EXAMPLE I

For an alternating current light valve, a glass substrate with an indium tin oxide electrode layer was selected. Such a glass substrate with indium tin oxide electrode surface is commercially available. The substrate of this electrode surface was then placed in an ion deposition system, such as that shown in FIGS. 1 and 2. Utilizing argon ions at an energy level of 1–7 keV at a silicon dioxide target 24, such as shown in FIG. 2, a 2700 Angstrom layer of silicon dioxide was sputter deposited on the electrode material after approximately 27–30 minutes.

A similar coating was obtained by radio frequency sputtering, in a conventional system.

The substrate with silicon dioxide on the electrode material was then placed into or left in the ion beam system, depending upon whether the silicon dioxide layer was deposited by ion beam deposition or RF plasma sputtering. The surface of the silicon dioxide, such as surface 42, was turned to approximately 20° incident to an oncoming argon ion beam, such as shown in FIG. 1. The beam was broadly applied at an energy of 2.5 keV with an intensity of 0.2 ma/cm$^2$. After approximately 6 minutes, the etching or scrubbing operation removed approximately 700 Angstroms of silicon dioxide. Thereafter, the liquid crystal material was placed on the scrubbed silicon dioxide surface and the cell was assembled into a completed unit.

EXAMPLE II

For a reflective surface, the substrate of glass in one case and an active device in another case had chromium evaporated thereon to approximately 2000 Angstroms. In another example the chromium was sputtered thereon. Thereafter, the same scrubbing steps as inscribed in Example I above were taken to remove approximately 200 Angstroms of chromium material.

EXAMPLE III

The device of Example II was also further treated to increase its reflectivity by 60% by depositing silver on the chromium surface of FIG. 2 to a thickness of approximately 100 to 200 Angstroms. It was found that the surface texture produced in the chromium film was mapped through the silver and good uniform parallel alignment was achieved. The use of silver was required in those applications where the reflectivity of the chromium was too low; therefore, the thin layer of silver greatly enhanced the reflectivity, while still producing alignment of the liquid crystal subsequently placed thereon.

EXAMPLE IV

For DC light valve operation, approximately 100 to 150 Angstroms of carbon was sputtered on an indium tin oxide electrode. Following the deposition of the carbon layer, such as shown by indicium 42, the scrubbing steps of Example I were followed; however, only 50 to 100 Angstroms of material was removed.

In all the above examples, the results were found to provide microscopically fine grooves or streaks on the surface of layer 42 which were (1) reproducibly effective in causing parallel alignment of the liquid crystal molecules, (2) were durable to repeated cleaning procedures and air-bake treatments, and (3) were amenable to production application in conjunction with sputtering deposition equipment. The above experiments, which are representative of the methods of the present invention yielded excellent alignment homogeniety and durability, including repeated cleansing of the surfaces with organic solvents and air-baked at 500° C. for one hour.

Although the invention has been described with reference to particular embodiments thereof, it should be realized that various changes and modifications may be made therein without departing from the spirit and scope of the invention.

What is claimed is:

1. A method for inducing uniform parallel alignment of liquid crystal material on a substrate surface for use in a liquid crystal cell comprising the steps of:
   placing a coating, capable of being ion beam micromachined, over the substrate surface; and
   exposing the substrate surface coating to a beam of space charge-neutralized ions directed at an angle to the surface coating for uniformly and microscopically scrubbing the coating and thereby for reproducibly inducing substantially parallel alignment of the liquid crystal material when in contact with the scrubbed surface coating.

2. A method as in claim 1 wherein said pre-exposing coating step comprises the step of coating the substrate surface with a passivating layer of silicon dioxide, aluminum oxide, or titanium dioxide in a thickness range of 100 to 5000 Angstroms for providing the coating.

3. A method as in claim 1 wherein said pre-exposing coating step comprises the step of coating the substrate surface with a reflecting layer of chromium or chromium and gold in a thickness range of 100 to 5000 Angstroms for providing the coating.

4. A method as in claim 1 wherein said pre-exposing coating step comprises the step of coating the substrate surface with a layer of carbon in a thickness range of 100 to 5000 Angstroms for providing the coating.

5. A method as in claim 1 wherein the substrate surface comprises an electrode, and wherein said pre-exposing coating step comprises the step of coating the electrode surface with means for enabling the liquid crystal cell to operate in the environment for which it is intended, for inhibiting electro-chemical action with the liquid crystal material, for subjecting the electrode to minimum deterioration in time, and for avoiding undesired changes in characteristics of the liquid crystal material.

6. A method as in claim 5 wherein the coated substrate surface means comprises one of silicon dioxide, aluminum oxide, titanium dioxide, chromium, chromium and gold, and carbon.

7. A method as in claim 5 further comprising the step of applying the coated substrate surface means in the thickness range of 100–5000 Angstroms.

8. A method as in claim 7 wherein said applying step comprises the step of sputtering the coating on the substrate surface.

9. A method as in claim 8 wherein said sputtering step and said exposing step are successively performed by the beam of neutralized ions.

10. A method as in claim 1 wherein said exposing step comprises the step of directing a broad beam of the neutralized ions for minimizing fringing effects on the coated substrate surface.

11. A method as in claim 1 wherein said exposing step comprises the steps of directing a narrow beam of the neutralized ions and moving one of the coated substrate surface and the narrow beam with respect to the other thereof.

12. A method as in claim 1 wherein said exposing step comprises the step of directing the beam of neutralized ions at approximately 10° to 30° with respect to the coated substrate surface.

13. A method as in claim 1 wherein said exposing step comprises the step of utilizing argon ions as the beam of neutralized ions at an energy of approximately 1-3 keV.

14. A method for inducing parallel alignment of liquid crystal material for use in an alternating current liquid crystal light valve, comprising the steps of:
   placing a substrate of silicon dioxide having a coating thereon of indium tin oxide for defining an electrode for the light valve in means for defining one of an ion beam deposition system and a radio frequency plasma sputtering system and for employing a source of argon ions;
   suitably positioning a target of silicon dioxide and the substrate, and directing the argon ions at an energy of approximately 1-7 keV at the silicon dioxide target for approximately 27-30 minutes, for depositing a surface layer of approximately 2700 Angstroms of silicon dioxide on the indium tin oxide coating; and
   directing a broad beam of the argon ions at an angular incidence of approximately 20° with respect to the silicon dioxide surface layer at an energy of approximately 2.5 keV and at an intensity of approximately 0.2 ma/cm$^2$ for approximately 6 minutes for selectively removing approximately 700 Angstroms of the silicon dioxide surface layer and for providing a surface condition sufficient for inducing parallel alignment of the liquid crystal material on the surface layer having the surface condition thereon when the liquid crystal material is subsequently placed in contact therewith.

15. A method for inducing parallel alignment of liquid crystal material for use in a direct current liquid crystal light valve, comprising the steps of:
   placing a substrate having a coating thereon of indium tin oxide for defining an electrode for the light valve in means for defining one of an ion beam deposition system and a radio frequency plasma sputtering system and for employing a source of argon ions;
   suitably positioning a target of chromium and the substrate, and directing the argon ions at an energy of approximately 1-7 keV at the chromium target for approximately 27-30 minutes, for depositing a surface layer of approximately 2000 Angstroms of chromium on the indium tin oxide coating; and
   directing a broad beam of the argon ions at an angular incidence of approximately 20° with respect to the chromium surface layer at an energy of approximately 2.5 keV and at an intensity of approximately 0.2 ma/cm$^2$ for approximately 6 minutes for selectively removing approximately 700 Angstroms of the chromium surface layer and for providing an optically reflective surface and a surface condition sufficient for inducing parallel alignment of the liquid crystal material on the surface layer having the surface condition when the liquid crystal material is subsequently placed in contact therewith.

16. A method as in claim 15 further comprising the step of depositing a layer of silver on the chromium layer to a thickness of approximately 100–200 Angstroms for increasing the reflectivity thereof while otherwise preventing obscuring of the surface condition.

17. A method for inducing parallel alignment of liquid crystal material for use in a direct current liquid crystal light valve, comprising the steps of:
   placing a substrate having a coating thereon of indium tin oxide for defining an electrode for the light valve in means for defining one of an ion beam deposition system and a radio frequency plasma sputtering system and for employing a source of argon ions;

suitably positioning a target of carbon and the substrate, and directing the argon ions at an energy of approximately 1-7 keV at the carbon target for approximately 27-30 minutes, for depositing a surface layer of approximately 100-150 Angstroms of carbon on the indium tin oxide coating; and directing a broad beam of the argon ions at an angular incidence of approximately 20° with respect to the carbon surface layer at an energy of approximately 2.5 keV and at an intensity of approximately 0.2 ma/cm$^2$ for approximately 6 minutes for selectively removing approximately 50-100 Angstroms of the carbon surface layer and for providing a surface condition sufficient for inducing parallel alignment of the liquid crystal material on the surface layer having the surface condition when the liquid crystal material is subsequently placed in contact therewith.

* * * * *